United States Patent
Madrid et al.

(10) Patent No.: US 10,287,129 B2
(45) Date of Patent: May 14, 2019

(54) SPOOL HOLDER AND METHOD OF SUPPORTING SPOOL OF WIRE WITH SPOOL HOLDER

(71) Applicant: Caterpillar Inc., Peroria, IL (US)

(72) Inventors: Jose Guadalupe Salas Madrid, Torreon Coahuila (MX); Alejandro Gerardo Oviedo Flores, Garcia (MX); Israel Dominguez Palacios, Gomez Palacio Dgo. (MX); Ruben Alejandro Cardenas Garcia, Gomez Palacio Dgo. (MX)

(73) Assignee: Caterpillar Inc., Deerfield, IL (US)

( * ) Notice: Subject to any disclaimer, the term of this patent is extended or adjusted under 35 U.S.C. 154(b) by 260 days.

(21) Appl. No.: 15/289,363

(22) Filed: Oct. 10, 2016

(65) Prior Publication Data
US 2018/0099834 A1 Apr. 12, 2018

(51) Int. Cl.
*B65H 49/20* (2006.01)
*B65H 49/26* (2006.01)
(Continued)

(52) U.S. Cl.
CPC ............ *B65H 49/20* (2013.01); *B23K 9/124* (2013.01); *B23K 9/133* (2013.01); *B23K 9/173* (2013.01);
(Continued)

(58) Field of Classification Search
CPC ........ B65H 49/20; B65H 49/24; B65H 49/26; B65H 49/04; B65H 49/327; B65H 49/18;
(Continued)

(56) References Cited

U.S. PATENT DOCUMENTS 3,337,157 A * 8/1967 Plog .................. B23K 9/133
242/129.8
4,253,624 A * 3/1981 Colbert ................ B65H 49/02
242/128

(Continued)

FOREIGN PATENT DOCUMENTS

WO 2015036534 3/2015

OTHER PUBLICATIONS

Sealy Power Welder Instructions for: MIG Welder; Model No. MIGHTYMIG 150; Issue-2; Issue Date: Feb. 26, 2010; https://www.tooled-up.com/artwork/ProdPDF/MIGHTYMIG150.pdf (Year: 2010).*

*Primary Examiner* — Michael R Mansen
*Assistant Examiner* — Raveen J Dias
(74) *Attorney, Agent, or Firm* — Oblon, McClelland, Maier & Neustadt

(57) ABSTRACT

A spool holder includes a cylinder defining a longitudinal axis and having an external surface on which a spool of wire may be supported. A first plate is positioned at a first end of the cylinder and a second plate is positioned at a second end of the cylinder. Both first and second plates have portions extending radially outward from the external surface of the cylinder. The first and second plates both have a perpendicular orientation relative to the longitudinal axis. The first and second plates restrict axial movement of the spool of wire therebetween. The first plate and cylinder are stationary relative to a mounting structure, while the second plate is configured to rotate with the spool of wire. A mechanism urges the second plate and, thus, the spool of wire toward the first plate, thereby regulating rotation of the spool of wire.

17 Claims, 4 Drawing Sheets

(51) Int. Cl.
| | |
|---|---|
| *B65H 16/10* | (2006.01) |
| *B65H 49/34* | (2006.01) |
| *B65H 49/30* | (2006.01) |
| *B65H 57/06* | (2006.01) |
| *B23K 9/12* | (2006.01) |
| *B65H 75/02* | (2006.01) |
| *B23K 9/133* | (2006.01) |
| *B23K 9/173* | (2006.01) |
| *B23K 9/32* | (2006.01) |
| *B65H 49/32* | (2006.01) |
| *B65H 49/36* | (2006.01) |
| *B65H 57/18* | (2006.01) |
| *B65H 59/04* | (2006.01) |
| *B65H 16/00* | (2006.01) |

(52) U.S. Cl.
CPC ............ *B23K 9/32* (2013.01); *B65H 16/106* (2013.01); *B65H 49/26* (2013.01); *B65H 49/305* (2013.01); *B65H 49/327* (2013.01); *B65H 49/34* (2013.01); *B65H 49/36* (2013.01); *B65H 57/06* (2013.01); *B65H 57/18* (2013.01); *B65H 59/04* (2013.01); *B65H 75/02* (2013.01); *B65H 16/005* (2013.01); *B65H 2701/36* (2013.01)

(58) Field of Classification Search
CPC .. B65H 49/321; B65H 49/205; B65H 49/305; B65H 46/30; B65H 57/06; B65H 57/04; B65H 57/08; B65H 57/10; B65H 57/18; B65H 75/04; B65H 75/14; B65H 75/22; B65H 75/42; B65H 75/02; B65H 75/145; B65H 75/185; B65H 75/28; B65H 75/242; B65H 75/248; B65H 75/36; B65H 75/106; B65H 75/4444; B65H 75/141; B65H 75/34; B65H 75/30; B65H 75/4428; B65H 75/4436; B65H 75/4442; B65H 19/123; B65H 16/02; B65H 16/04; B65H 16/106; B65H 16/10; B65H 75/285; B65H 2402/33; B65H 2402/34; B65H 2301/41335; B65H 2301/41346; B65H 54/543; B65H 54/54; B65H 54/547; B65H 23/06; B65H 23/063; B65H 23/08; B65H 23/085; B65H 49/34; B65H 16/005; B23K 9/125; B23K 9/133; B23K 9/12; B23K 9/1333; B65B 67/085; B66D 5/22
USPC .... 242/405.1, 129.7, 566, 423, 423.1, 423.2
See application file for complete search history.

(56) References Cited

U.S. PATENT DOCUMENTS

| | | | |
|---|---|---|---|
| 4,534,499 A | | 8/1985 | Cox et al. |
| 4,657,204 A | * | 4/1987 | Colbert ................. B65H 57/20 242/128 |
| 5,551,647 A | | 9/1996 | Browning |
| 5,752,670 A | * | 5/1998 | Lasecki ................. B65H 49/32 242/381 |
| 5,948,296 A | * | 9/1999 | Williams ............. B23K 9/1333 219/137.2 |
| 6,279,849 B1 | * | 8/2001 | Martin .................. B65H 49/26 242/422.8 |
| 6,302,604 B1 | * | 10/2001 | Bryant ..................... B41J 15/02 101/288 |
| 8,602,341 B2 | | 12/2013 | Land |
| 9,950,895 B2 | * | 4/2018 | Weissbrod ............. B65H 49/38 |
| 2004/0200819 A1 | * | 10/2004 | Kensrue ................. B23K 9/133 219/137.7 |
| 2006/0032967 A1 | * | 2/2006 | Yu Chen ............... B65H 49/305 242/588 |
| 2008/0302899 A1 | | 12/2008 | Chang et al. |
| 2009/0236462 A1 | | 9/2009 | Burns |
| 2015/0129700 A1 | * | 5/2015 | Miller .................. B23K 9/1333 242/139 |
| 2016/0289040 A1 | * | 10/2016 | Schmitz .............. B65H 59/382 |
| 2017/0050818 A1 | * | 2/2017 | Nomura ................ B65H 49/32 |

\* cited by examiner

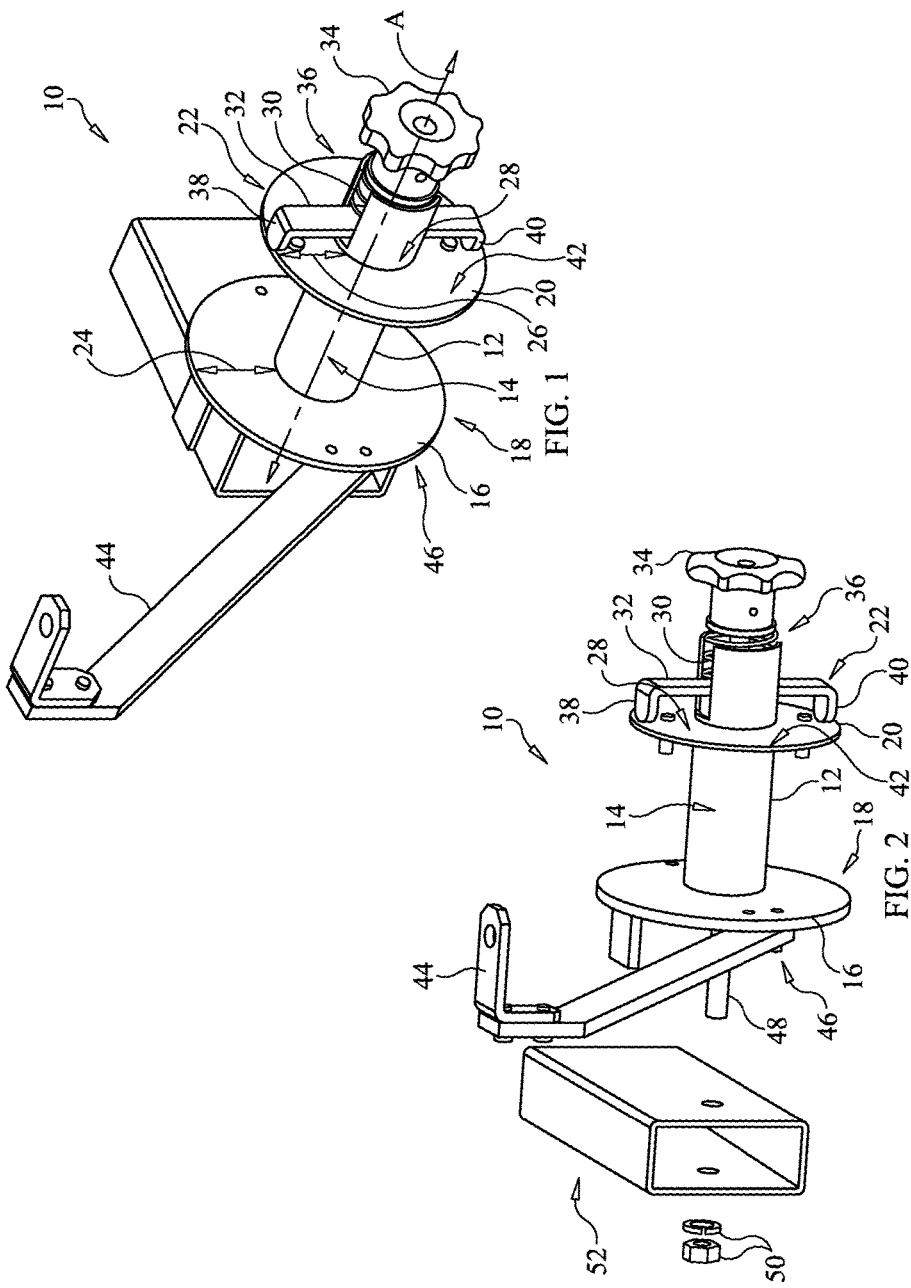

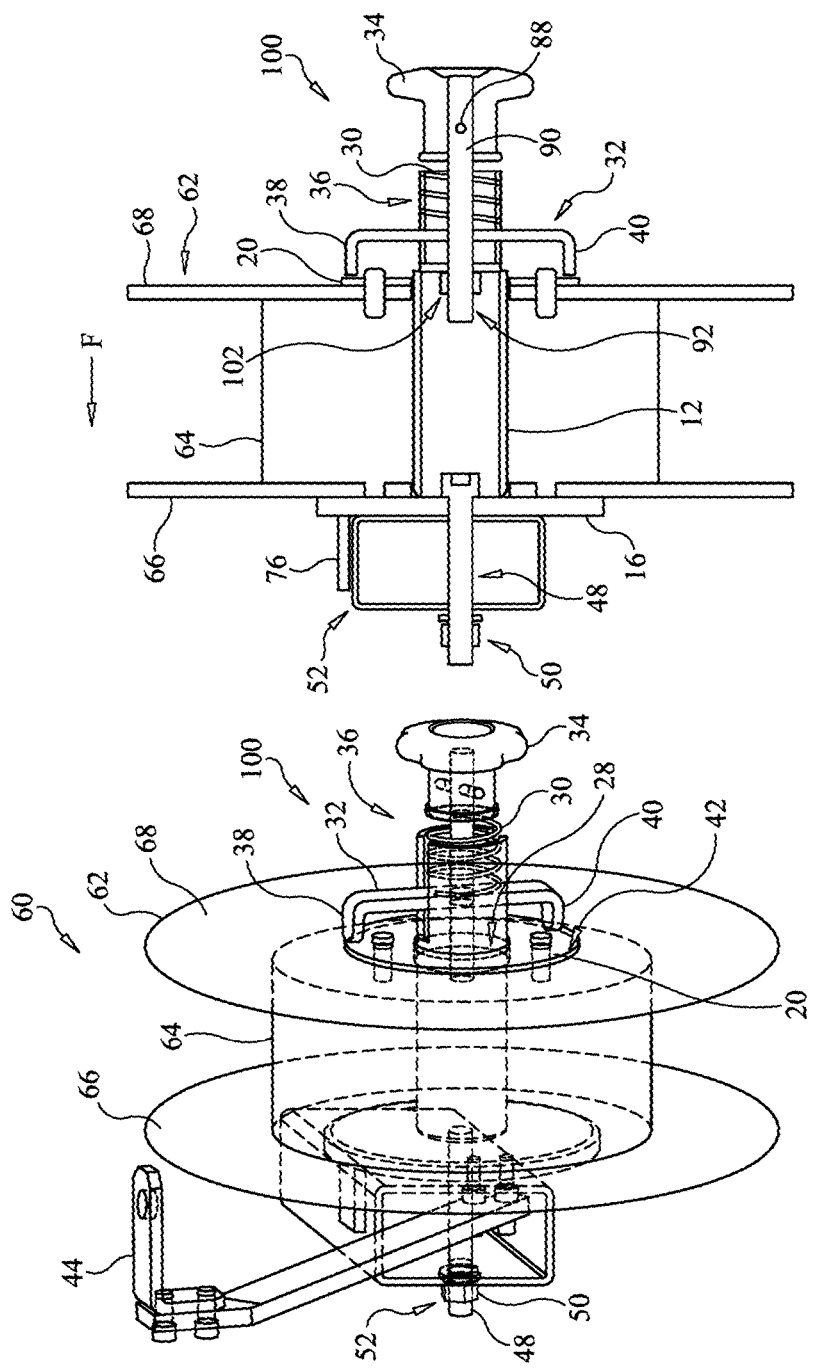

SPOOL HOLDER AND METHOD OF SUPPORTING SPOOL OF WIRE WITH SPOOL HOLDER

TECHNICAL FIELD

The present disclosure relates generally to a spool holder for supporting a spool of wire and, more particularly, to a spool holder with a mechanism for regulating rotation of the spool of wire.

BACKGROUND

A spool generally consists of a flanged or un-flanged cylinder on which thread, wire, cable or another material is wound for storage or use. The spool, or cylinder, typically includes an axial passage receiving a pin, spindle, or other structure that facilitates rotation of the spool. Material may be wound or unwound relative to the spool during rotation of the spool about the pin, spindle, or other spool holder. With respect to a welding process, for example, welding wire may be provided on a spool, which may be supported on a spool holder, and later unwound during use. Although various welding methods exist, according to some common welding methods welding wire is pulled from the spool, as needed, and is then heated with a base material to join the materials together at a weldment.

U.S. Pat. No. 4,534,499 to Cox et al. discloses a wire drive mechanism for advancing material, such as a wire, to a workstation. The wire drive mechanism includes a pair of frusto-conical shaped wheels mounted so as to engage the wire therebetween. At least one of the wheels is driven by drive means to advance the wire as needed. The wire drive mechanism also includes a pair of cone-shaped elements opposingly mounted on a common shaft so that the spool may be rotatably secured therebetween.

As should be appreciated, there is a continuing need to improve the efficiency of all aspects of machining processes, including the storage and use of various materials, while also keeping costs low.

SUMMARY OF THE INVENTION

In one aspect, a spool holder includes a cylinder defining a longitudinal axis and having an external surface on which a spool of wire may be supported. A first plate is positioned at a first end of the cylinder and a second plate is positioned at a second end of the cylinder. Both first and second plates have portions extending radially outward from the external surface of the cylinder. The first and second plates both have a perpendicular orientation relative to the longitudinal axis, and restrict axial movement of a spool of wire therebetween. The first plate and cylinder are stationary relative to a mounting structure, while the second plate is configured to rotate with the spool of wire. A mechanism urges the second plate and, thus, the spool of wire toward the first plate, thereby regulating rotation of the spool of wire.

In another aspect, a method of supporting a spool of wire with a spool holder includes steps of supporting the spool of wire on an external surface of a cylinder, and limiting axial movement of the spool of wire along the external surface of the cylinder between first and second plates. The first and second plates are substantially parallel to one another and perpendicular to a longitudinal axis of the cylinder. Each of the first and second plates includes at least a portion thereof extending radially outward from the external surface of the cylinder. The method also includes steps of fixing a position of the first plate and the cylinder relative to a mounting structure, and rotating the second plate with the spool of wire. The second plate and the spool of wire are urged toward the first plate during the rotating step using a mechanism, thereby regulating rotation of the spool of wire.

In yet another aspect, a spool holder assembly includes a cylinder having an external surface, a first plate positioned at a first end of the cylinder and having at least a portion thereof extending radially outward from the external surface of the cylinder, and a second plate positioned at a second end of the cylinder and having at least a portion thereof extending radially outward from the external surface of the cylinder. A spool of wire is supported on the external surface of the cylinder and is restricted in axial movement between the first and second plates. A mechanism urges the second plate and the spool of wire toward the first plate during rotation of the second plate and the spool of wire, thereby regulating rotation of the spool of wire.

BRIEF DESCRIPTION OF THE DRAWINGS

FIG. 1 is a perspective view of a spool holder, according to the present disclosure;

FIG. 2 is a partially exploded perspective view of the spool holder of FIG. 1;

FIG. 4 is a perspective view of a spool holder assembly, including the exemplary spool of wire supported on the spool holder of the present disclosure, with phantom lines depicting parts not readily visible in the current view;

FIG. 5 is a partial sectional view cut through a vertical axis of the spool holder assembly.

DETAILED DESCRIPTION

Figure 3:
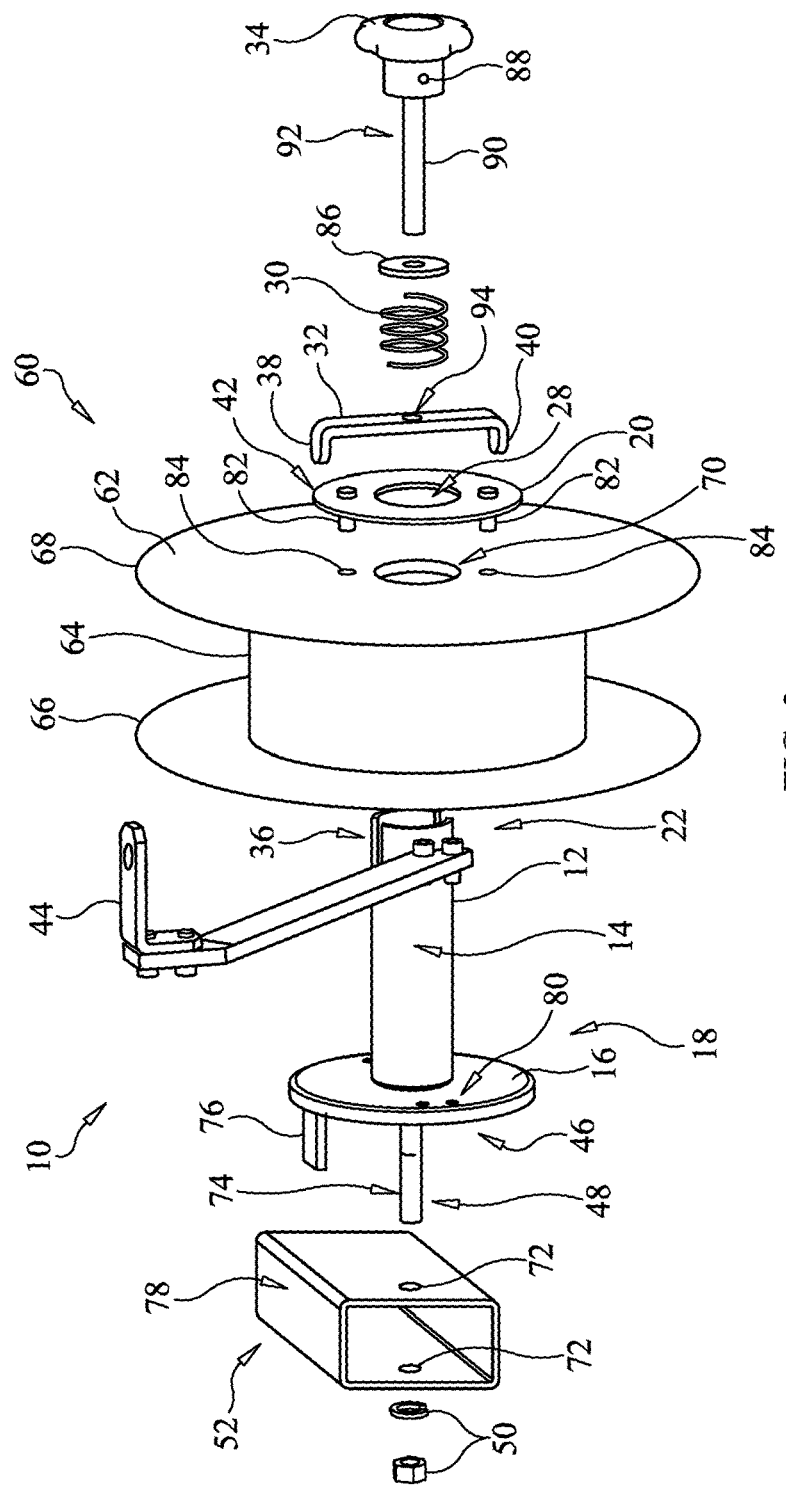
FIG. 3 is an exploded view of the spool holder of the previous FIGS. and an exemplary spool of wire, according to the present disclosure.

An exemplary spool holder of the present disclosure is shown at 10 in FIG. 1, and generally includes a cylinder 12 having an external surface 14 on which a spool or spool of wire, shown in later FIGS., may be supported. A first plate 16 is positioned at a first end 18 of the cylinder 12 and has at least a portion thereof, such as a peripheral portion, extending radially outward and beyond the external surface 14 of the cylinder 12. A second plate 20 is positioned at a second end 22 of the cylinder 12 and has at least a portion thereof extending radially outward and beyond the external surface 14 of the cylinder 12.

In some instances, one or both of the first and second plates 16, 20 may be or may include flanges 24, 26 extending radially outward from the cylinder 12. That is, the flanges 24, 26 may represent peripheral portions of the first and second plates 16, 20 extending radially outward from the external surface of the cylinder 12 and/or may represent the entirety of the plates 16, 20. According to some embodiments, the first and second plates 16, 20 may or may not be integral with the cylinder 12.

As shown in the exemplary embodiment, the second end 22 of the cylinder 12, or a portion thereof, may be received through a central opening 28 of the second plate 20. Clearance between these components may be such that the second plate 20 is rotatable about the cylinder 12, such as being rotatable with a spool of wire and/or movable axially relative to the cylinder 12. The first and second plates 16, 20 may be flat plates having predetermined thicknesses, as shown, and may be substantially parallel to one another and perpendicular to a longitudinal axis A of the cylinder 12.

The exemplary spool holder 10 also includes a spring 30, such as a compression spring, and lever 32 secured in relative positions at the second end 22 of the cylinder 12 by a knob star, or other similar component, 34. As shown, the lever 32 may be positioned at least partly within a slot 36 through the cylinder 12 and may include inwardly curved ends 38, 40 contacting an outer surface 42 of the second plate 20. The spring 30 may be compressed between the lever 32 and the knob star 34 to provide an inward force against the second plate 20 and toward the first plate 16, as will be discussed in greater detail below.

According to the exemplary embodiment, and relative to the context of welding, a welding wire guide 44, a component known to those skilled in the art, may extend radially outward from, and may be supported in part by, an outer surface 46 of the first plate 16. That is, the first plate 16 may include or may receive fasteners for attaching or coupling the welding wire guide 44 thereto. However, alternative placements of the welding wire guide 44 or other similar components are also contemplated.

Referring also to FIG. 2, the first plate 16 may further include or be configured to receive or support fasteners 48, 50 for fastening or securing the first plate 16 to a welding machine arm 52, or other support structure, such that the first plate 16 and the cylinder 12 are stationary relative to the welding machine arm 52. The welding machine arm 52 may be constructed with steel tubing and may be bolted, or otherwise secured, to a floor or other suitable worksite structure. "Fasteners," as the term is used herein, broadly includes a variety of threaded or unthreaded fasteners, such as, for example, bolts, clamps, clips, nails, pins, rings, screws, staples, straps, and the like.

Turning now to FIG. 3, a spool holder assembly 60, including components of the spool holder 10 discussed above with reference to FIGS. 1 and 2, is depicted in exploded fashion. FIG. 3 also includes a depiction of a spool of wire 62, which may be supported on the spool holder 10. The spool of wire 62 generally includes a cylinder 64 with ends 66, 68 on which thread, wire, cable or another material may be wound, and may be of various sizes and weights. The spool of wire 62 also includes an axial passage 70, which may receive the cylinder 12 of the spool holder 10.

As shown, the first plate 16 may be fastened to the welding machine arm 52 using fasteners 48, 50. In particular, and according to the exemplary embodiment, a socket head screw, or other mechanical fastening device, 48 may be received through openings 72 of the welding machine arm 52. A lock washer and hex nut set 50 may be fastened to a threaded end 74 of the socket head screw 48 to secure a stationary position of the first plate 16 and cylinder 12 relative to the welding machine arm 52 and, according to some embodiments, the worksite floor. Of course, other fastening means may be used instead. A guide 76 may extend outwardly from the outer surface 46 of the first plate 16 and may rest on a top surface 78 of the welding machine arm 52, for support and/or orientation of the assembly components.

The cylinder 12 may be attached to or coupled with the first plate 16, such that the cylinder 12 is stationary relative to the first plate 16. According to some embodiments, the first plate 16 and cylinder 12 may be a unity structure, including, for example, a structure including components that have been welded, or otherwise secured, together. The welding wire guide 44 may attach to the outer surface 46 of the first plate 16 in a known fashion, such as by using fastener openings 80 provided through the first plate 16, and may also have a relatively stationary position, such as relative to the worksite floor. The spool of wire 62 may include the axial passage 70 through which the cylinder 12 may be received. The cylinder 12, which may or may not be hollow, may thereafter support the spool of wire 62 on the external surface 14 thereof.

The second plate 20 may be attached or coupled to the spool of wire 62 using any known attachment means. For example, round bars 82 may be provided on the second plate 20 for frictional engagement with openings 84 of the end 68 of the spool of wire 62. With the second plate 20 attached to the spool of wire 62 and the spool of wire 62 supported on the cylinder 12, the second end 22 of the cylinder 12, including the slot 36, may be exposed through the end 68 of the spool of wire 62 and through the second plate 20 for receipt of the lever 32, spring 30 and a washer 86. The knob star 34, which may include a pin 88 securing attachment of a bar 90 thereto, may secure the lever 32 and spring 30 in place. In particular, a threaded end 92 of the bar 90 may pass through the washer 86, spring 30, and an opening 94 of the lever 32, and ultimately engage internal threads of a component supported within the cylinder 12 to compress the spring 30 to provide a desired force.

FIG. 4 depicts the spool holder assembly 60 in an assembled configuration, with components or lines not readily visible in this view shown in phantom. FIG. 5 depicts a sectioned view of the spool holder assembly 60 through a vertical axis. With reference to both FIGS., it should be clear that the first and second plates 16, 20 limit axial movement of the spool of wire 62. Rotation of the first plate 16 and cylinder 12 is inhibited, while the spool of wire 62 and second plate 20 rotate together. A mechanism 100, described above and generally including the lever 32, spring 30 and knob star 34, urges the second plate 20, and thus the spool of wire 62, toward the first plate 16. In other words, and referring particularly to FIG. 5, the spring 30 applies an inward force F on the lever 32, the outer surface 42 of the second plate 20, and the spool of wire 62.

Tension in the spring 30 may be regulated, or adjusted, by the knob star 34. That is, according to the exemplary embodiment, the threaded end 92 of the bar 90 may be received within an internally threaded receiving nut 102. The knob star 34 may be rotated clockwise, for example, to increase the spring force or rotated counterclockwise to decrease the spring force applied by the spring 30. The spring force may regulate, or control, rotation of the spool of wire 62, such as by compressing the components axially and controlling the rotation through frictional engagement. As the amount of material supported on the spool of wire 62 decreases, it may be desirable to increase the amount of spring force.

INDUSTRIAL APPLICABILITY

The present disclosure relates generally to a spool holder for a spool of wire. More specifically, the present disclosure relates to a mechanism for regulating, or controlling, rotation of the spool of wire during use. Although the concepts disclosed herein are described with reference to a spool of wire, the concepts are believed to have broader applicability, including applicability to a wide range of holders for supporting a range of different materials.

Figure 6:
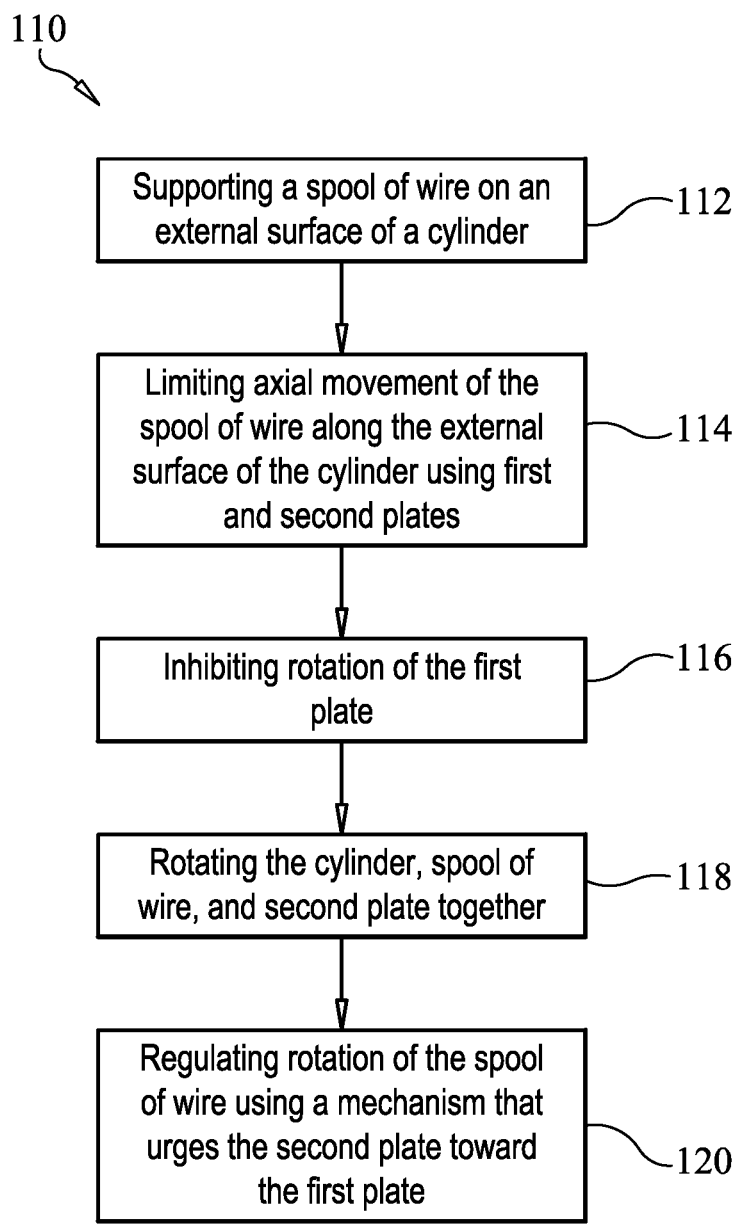
FIG. 6 is a flow chart representing a simplified method of supporting the exemplary spool of wire with the spool holder of the present disclosure.

Referring to FIGS. 1-5 and also to FIG. 6, a method of supporting the spool of wire 62 with the spool holder 10 is discussed with reference to a basic flow diagram 110. At a first step, at box 112, the spool of wire 62 may be supported on the external surface 14 of the cylinder 12. At a second step, at box 114, axial movement of the spool of wire 62 along the external surface 14 of the cylinder 12 is limited, or restricted, using the first and second plates 16, 20. Rotation of the first plate 16 and the cylinder 12 is inhibited, at box 116, while the spool of wire 62 and second plate 20 rotate together, at box 118, about the cylinder 12. At box 120, rotation of the spool of wire 62 is regulated, or controlled, using a mechanism 100 that urges the second plate 20 toward the first plate 16.

The spool holder assembly 60 of the present disclosure may provide a supported and controlled rotation of a spool of wire 62. The controlled rotation may increase efficiency in processes requiring unspooling, or even spooling, of the spool of wire 62. In particular, for example, controlled rotation of the spool of wire 62 may reduce occasions where the spool of wire 62 may be slipped from the spool holder, spin uncontrollably, and/or a material from the spool of wire 62 may come off uncontrollably. The spool holder assembly 60 of the present disclosure may be a cost effective means of regulating rotation of the spool of wire 62.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A spool holder, including:
 a cylinder defining a longitudinal axis and having an external surface configured to support a spool of wire;
 a first plate positioned at a first end of the cylinder and having a perpendicular orientation relative to the longitudinal axis, wherein a portion of the first plate extends radially outward from the external surface of the cylinder;
 a second plate positioned at a second end of the cylinder and also having a perpendicular orientation relative to the longitudinal axis, wherein a portion of the second plate extends radially outward from the external surface of the cylinder;
  wherein, when the spool of wire is supported on the cylinder, the first and second plates restrict axial movement of the spool of wire therebetween, and
  wherein the first plate and the cylinder are stationary relative to a mounting structure, and the second plate and the spool of wire rotate together; and
 a mechanism configured to urge the second plate and, thus, the spool of wire toward the first plate, thereby regulating rotation of the spool of wire,
 wherein the mechanism includes a lever having a planar body, a first right-angled end portion at a first end thereof and a second right-angled end portion at a second end thereof opposite the first end,
 wherein the lever is positioned within a slot through the cylinder at the second end of the cylinder,
 wherein a length of the lever matches a diameter of the second plate, and
 wherein the lever contacts the second plate such that a tip of the first right-angled end portion contacts the second plate at a first perimeter position, a tip of the second right-angled end portion contacts the second plate at a second perimeter position 180 degrees offset from the first perimeter position, and the planar body does not contact the second plate.

2. The spool holder of claim 1, wherein the second end of the cylinder is received through a central opening of the second plate.

3. The spool holder of claim 2, wherein the mechanism further includes a spring applying an inward force on the lever and, thus, an outer surface of the second plate and the spool of wire.

4. The spool holder of claim 3, wherein the spring is compressed between the lever and a knob star.

5. The spool holder of claim 1, wherein the cylinder is hollow.

6. The spool holder of claim 1, further including a welding wire guide extending radially outward from an outer surface of the first plate.

7. The spool holder of claim 1, further including fasteners configured to couple the first plate with a welding machine arm, such that the first plate and the cylinder are stationary relative to the welding machine arm.

8. The spool holder of claim 1, further including fasteners configured to couple the second plate with the spool of wire, such that the second plate and the spool of wire rotate together about the cylinder.

9. A method of supporting a spool of wire with a spool holder, the method including:
 supporting the spool of wire on an external surface of a cylinder having a first end and a second end opposite the first end;
 limiting axial movement of the spool of wire along the external surface of the cylinder between a first plate and a second plate, wherein the first and second plates are substantially parallel to one another and perpendicular to a longitudinal axis of the cylinder, wherein each of the first and second plates includes at least a portion thereof extending radially outward from the external surface of the cylinder;
 fixing a position of the first plate and the cylinder relative to a mounting structure;
 rotating the second plate with the spool of wire; and
 urging the second plate and the spool of wire toward the first plate during said rotating using a mechanism, thereby regulating rotation of the spool of wire,
 wherein the mechanism includes a lever having a planar body, a first right-angled end portion at a first end thereof and a second right-angled end portion at a second end thereof opposite the first end,
 wherein the lever is positioned within a slot through the cylinder at the second end of the cylinder,
 wherein a length of the lever matches a diameter of the second plate, and
 wherein during said urging, the lever contacts the second plate such that a tip of the first right-angled end portion contacts the second plate at a first perimeter position, a tip of the second right-angled end portion contacts the second plate at a second perimeter position 180 degrees offset from the first perimeter position, and the planar body does not contact the second plate.

10. The method of claim 9, further including coupling the first plate with a welding machine arm.

11. The method of claim 9, further including coupling the second plate with the spool of wire such that the second plate and the spool of wire rotate about the cylinder.

12. The method of claim 9, further including applying an inward force on the lever, an outer surface of the second plate, and the spool of wire using a spring.

13. The method of claim 12, further including compressing the spring between the lever and a knob star.

14. A spool holder assembly, including:
a cylinder having an external surface;
a first plate positioned at a first end of the cylinder and having at least a portion thereof extending radially outward from the external surface of the cylinder;
a second plate positioned at a second end of the cylinder and having at least a portion thereof extending radially outward from the external surface of the cylinder;
a spool of wire supported on the external surface of the cylinder and restricted in axial movement between the first and second plates; and
a mechanism urging the second plate and the spool of wire toward the first plate during rotation of the second plate and the spool of wire, thereby regulating rotation of the spool of wire,
wherein the mechanism includes a lever having a planar body, a first right-angled end portion at a first end thereof and a second right-angled end portion at a second end thereof opposite the first end,
wherein the lever is positioned within a slot through the cylinder at the second end of the cylinder,
wherein a length of the lever matches a diameter of the second plate, and
wherein the lever contacts the second plate such that a tip of the first right-angled end portion contacts the second plate at a first perimeter position, a tip of the second right-angled end portion contacts the second plate at a second perimeter position 180 degrees offset from the first perimeter position, and the planar body does not contact the second plate.

15. The spool holder assembly of claim 14, further including fasteners configured to couple the first plate with a welding machine arm, such that the first plate and the cylinder are stationary relative to the welding machine arm.

16. The spool holder assembly of claim 14, wherein a spring urges the lever and, thus, the tips of the first and second right-angled end portions into contact with an outer surface of the second plate.

17. The spool holder assembly of claim 16, wherein the spring is compressed between the lever and a knob star.

\* \* \* \* \*